Patented Aug. 23, 1932

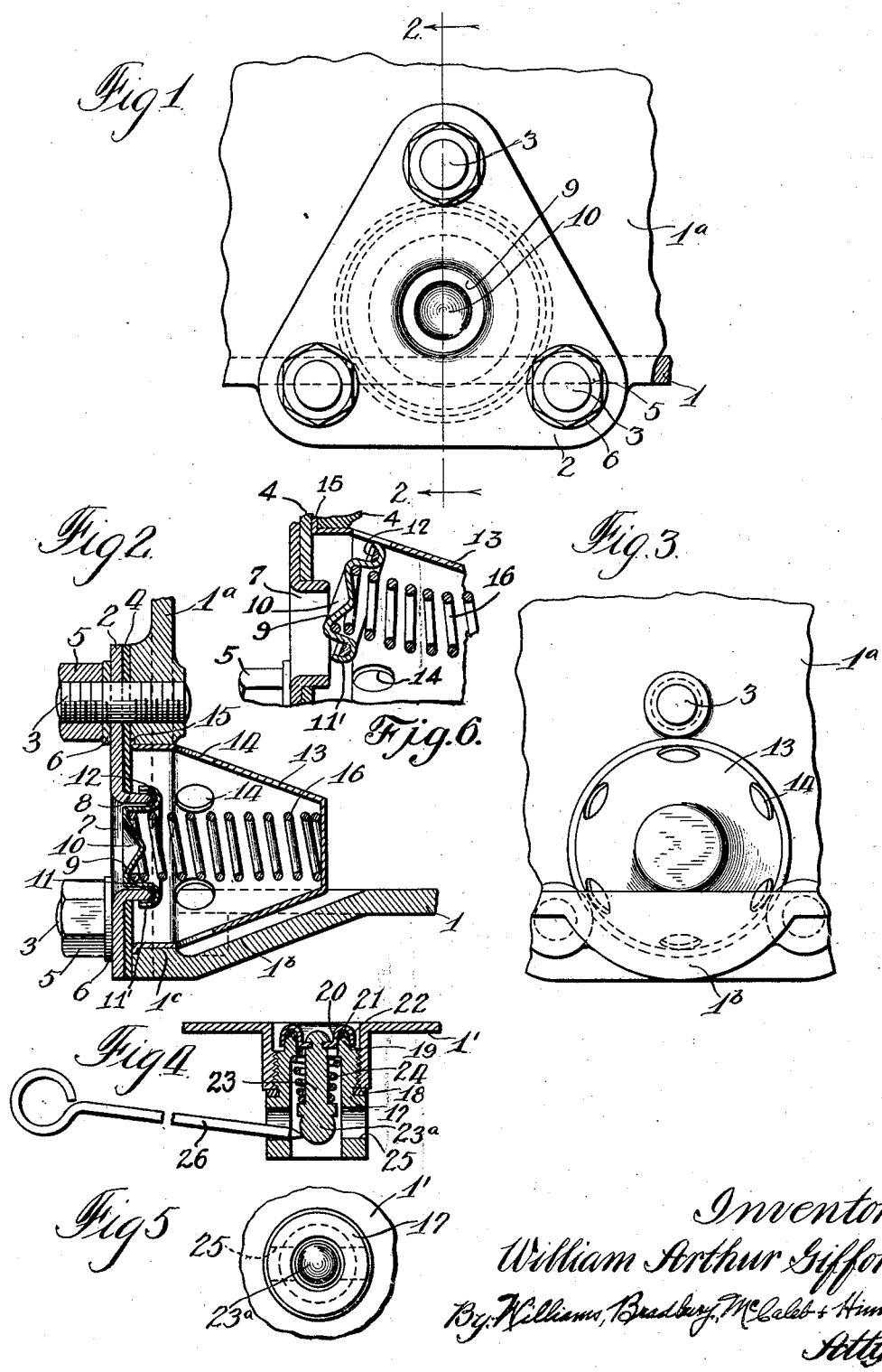

1,872,928

UNITED STATES PATENT OFFICE

WILLIAM ARTHUR GIFFORD, OF LANSING, MICHIGAN

VALVE

Application filed September 4, 1925. Serial No. 54,422.

My invention relates to valves, particularly to those adapted to drain the oil from the crank case of an internal combustion engine. It will be understood, however, that the valve may be readily adapted for use on washing machines and on any other container from which it is desired to release a fluid, and that certain features such as the valve seat may also be used in sealing devices.

The object of my invention is to provide a valve which is simply constructed and may be cheaply manufactured.

A further object is to provide a valve in which the valve disc is self-centering with respect to its seat without the use of the usual valve stem and guide.

A further object is to provide a sealing device having seat packing which is entirely confined and prevented from being distorted when the valve is closed and which is not subject to deformation between the sealing disc and its seat.

A further object is to provide a valve having a depression adapted to receive the end of a stick or finger and be thereby operated.

Other objects will appear from the following description, reference being made to the accompanying drawing, in which, Figure 1 is a front elevation of the valve shown attached to a crank case;

Figure 2 is a vertical cross sectional view taken on the line 2—2 of Fig. 1;

Figure 3 is a rear elevation of the valve;

Figure 4 is a vertical cross sectional view of a modification of my invention, and Figure 5 is a bottom plan view of the modification shown in Fig. 4.

Fig. 6 is a vertical cross sectional view of the valve shown in Figs. 1, 2 and 3, with the disc in its displaced or open position.

My invention is illustrated in connection with the crank case of an internal combustion engine, the bottom 1 of which has a depressed portion 1b to receive the valve and to provide a well into which the oil may drain.

The valve body 2 is attached to the side 1a of the crank case over a circular aperture 1c therein by any suitable means such as the studs 3 which are screwed into threaded bore holes in the side of the crank case. A suitable gasket 4 is interposed between the valve body and the crank case, and the former securely drawn up to the latter by means of the nuts 5 and lock washers 6 co-operating with the studs 3.

The valve body 2 has a circular orifice 7 positioned at or below the level of the bottom of the crank case. A flange 8 is turned inwardly around the periphery of this orifice to form the valve seat, which is rounded as shown in Fig. 2.

The valve disc 9 is formed with a conical centrally located depression 10 to receive a pointed stick, the finger or the end of any small tool by which the valve disc 9 is to be displaced. This disc has an inwardly extending cylindrical side portion 11 with its end turned back on itself as at 11' to form an annular U shaped groove adapted to receive the ring shaped packing washer 12, which acts as a seal between the valve disc and its seat. This construction permits the use of cork, asbestos and other relatively fragile compressible sealing materials, since the packing is securely held against deformation and is not subject to tearing or abrasive strains. The outer wall 11' of the U-shaped annular groove is not extended as far above or beyond the packing washer as is the inner wall. This difference in the dimensions of the inner and outer walls of the groove is an important factor in securing the desired operation of the valve. These walls make necessary an initial axial movement of the valve disc prior to its lateral opening movement, thus eliminating the possibility of abrasion of the packing.

A cup shaped member 13 forming the inner case or shell of the valve is perforated as at 14 to admit oil. An outwardly extending flange around the brim of this cup member fits into an annular recess cut in the side of the crank case, so as to be secured in place when the valve body 2 is in position. A coil spring 16 is compressed between the base of the cup member 13 and the valve disc 9. The end convolutions of this spring are normally disposed in planes at right angles to the axis of the spring so that the spring not only exerts a force in the direction of its axis to press the valve disc 9 against its seat when the valve is closed, but also exerts a lateral force to hold the valve disc in its displaced or "open" position, as is best shown in Fig. 6. The cup member 13 is of sufficient diameter to permit the valve disc 9 to be moved to uncover a large portion of the opening 7, and yet serve as a retainer to prevent the disc from being moved from its seat to a position where it can not be engaged for closing by the finger or a tool inserted in the orifice 7.

To open the valve a pointed stick or any other suitable instrument is applied to the valve disc 9 and sufficient pressure exerted to compress the spring 16 far enough to permit the disc to be moved to the side of the orifice, thus allowing the oil to flow from the crank case. The friction between the disc (when the disc has been moved laterally to partially uncover the orifice) and seat due to the pressure of the spring is sufficient to hold the disc in open position. To close the valve it is merely necessary to apply sufficient pressure to the portion of the disc which projects over the orifice to slightly relieve the friction between the disc and the seat and the disc will snap back over its seat due to the self centering action of the spring. The only time when the ring seat packing is subject to any strain is when the valve is on its seat, and at this time the packing is entirely confined between the seat and the disc and subject to compression only.

The valve disc may be said to have three distinctive phases of movement. The first movement at opening is an axial movement. The second movement is a lateral movement over the seat against the centering force of the spring. The third phase is in reality a continuation of the second, except that the spring does not resist the further lateral movement. Vice versa, in closing the first phase of the movement of the disc is a radial inward movement, overcoming the friction of the valve disc on its seat. The second phase of the movement is automatic, in that the spring exerts a centering force and, due to the slight curvature of the seat and the rounded contacting edge of the valve disc, slides the disc over its seat, and as the third phase of the disc movement the spring moves the disc axially, pressing it against the seat to form a secure seal.

The modification shown in Figures 4 and 5 is adapted to replace the plug usually found at the bottom of the crank case in most makes of automobile engines. It consists of the body member 17 which is screw threaded to fit into the drain hole in the crank case 1', a gasket 18 sealing this connection. Body portion 17 at its upper end has an annular valve seat 19. The valve disc 20 is formed with an annular groove 21 into which the packing ring 22 is fitted. As is seen the packing ring and the annular groove co-operate with the valve seat 19. A pin 23 is riveted through the center of the disc 20 and at its lower end has an approximately hemispherical knob 23a. The disc 20 is held to the seat 19 by means of a spring 24 which is compressed between the body portion 17 and a flange at the lower end of the pin 23. The body portion has a diametrical hole 25 at its lower end into which any pointed instrument may be inserted to wedge the pin 23 upwardly and thus raise the valve disc from its seat. In this modification it is necessary to hold the disc in raised position by leaving the pointed instrument as 26, projecting through the hole 25 and in engagement with the pin 23 while the oil is being drained. The hole 25 may also conveniently be used in screwing the valve into the crank case.

This invention is capable of wide variation and adaptation in other respects for use in different embodiments without departure from the principles of the invention. I do not restrict myself in any essential particulars, and what I claim and desire to secure by Letters Patent is:

1. A valve having an annular seat, a valve disc having a groove to receive said seat, resilient means tending normally to force said valve towards said seat, manipulative means on said disc whereby it may be moved laterally relative to said seat, and means to prevent lateral movement of said disc until it has moved axially a predetermined distance from said seat.

2. A valve comprising a body having an orifice therein, a valve seat surrounding said orifice, a manually operable disc mounted for both initial axial movement and subsequent lateral movement a sufficient distance to uncover said orifice, means normally tending to hold said disc over said orifice, and means, operable only when said disc is in position over said orifice and engaging said seat or closely adjacent thereto, to prevent lateral movement thereof.

3. A valve comprising a body member, a flange around an orifice in said member, a valve disc constrained by said flange to move axially for a limited distance but capable of subsequent lateral movement, said disc having a peripheral groove adapted to receive said flange, a packing material imbedded in and only partially filling said groove, and a relatively large diameter coil spring having its end coils normally in parallel planes, said spring engaging said disc and operable to move said disc laterally and axially to engage said flange and close said orifice.

4. A valve comprising a seat, a valve disc having a peripheral groove containing packing adapted to engage said seat, said disc having a depression at the center thereof whereby it may be manipulated laterally in any one of a plurality of directions relative to said seat, and resilient means tending to center and hold said disc on said seat.

5. A container draining means, comprising a container having an aperture therein, a cup shaped perforated member having an outwardly extending flange around its brim, said member fitting into said aperture and said flange mounted in a recess formed around the aperture, a plate fastened to said container for holding said member in position, said plate having an orifice therein and an inwardly extending flange about said orifice forming a valve seat, a valve disc adapted to engage said seat, and a compression spring engaging the base of the cup member at one end and the valve disc at the other.

6. A valve comprising a valve seat, a valve disc having a relatively fragile packing partially filling a groove therein and engageable with said seat, said disc being mounted for axial unseating and subsequent lateral opening movement, and a compression spring tending first to center said disc over said seat and then to force said disc axially into sealing contact with said seat.

7. A valve comprising an annular inwardly projecting valve seat, an axially and laterally movable valve disc having a peripheral groove adapted to engage said seat, said valve disc being movable laterally in any one of a plurality of directions, a packing ring fitted in and only partially filling said groove, resilient means adapted to urge said disc laterally toward said seat and then axially into engagement therewith, and means to prevent axial movement of said disc prior to lateral movement thereof during the closing operation.

8. A valve comprising a valve seat, a valve disc having a peripheral groove adapted to fit over said seat, a packing ring in said groove, an indented portion on said disc accessible for direct initial axial movement of the disc and subsequent lateral movement thereof, and means for resiliently urging said disc toward said seat.

9. A valve comprising a body member, a valve seat surrounding an orifice in said member, an initially axially and subsequently diversely laterally movable valve disc having a peripheral groove partially filled with packing and adapted to be pressed against said seat, a member surrounding said valve seat and spaced therefrom to limit the lateral movement of said disc, and a compression spring having its bearing ends in the planes perpendicular to its axis and engaging said valve disc at one end and said member at the other.

10. A valve comprising a tubular member having a seat at its outer edge, a valve disc having a guiding portion projecting within said tubular member, a rebent peripheral flange on said disc forming an annular groove for the reception of sealing material, said flange being adapted to fit over said seat, and said valve disc being free to move laterally relative to said seat upon removal of said guiding portion from said tubular member, and resilient means for maintaining said valve disc firmly on said seat.

11. A valve comprising a tubular member having a seat at its outer edge, a valve disc having a guiding portion projecting within said tubular member, a rebent peripheral flange on said disc forming an annular groove for the reception of sealing material, said flange being adapted to fit over said seat, and said valve disc being free to move laterally relative to said seat upon removal of said guiding portion from said tubular member, and resilient means for maintaining said valve disc in a position laterally displaced from its seat.

12. A valve comprising a tubular member having a seat at its outer edge, a valve disc having a guiding portion projecting within said tubular member, a rebent peripheral flange on said disc forming an annular groove for the reception of sealing material, said flange being adapted to fit over said seat, and said valve disc being free to move laterally relative to said seat upon removal of said guiding portion from said tubular member, and resilient means adapted to maintain said valve disc in a position either on its seat or in a position laterally displaced therefrom.

13. A valve comprising a body member having a tubular flanged seat, an axially and laterally movable valve disc having a manually accessible recess to receive a rod or the like whereby said disc may be axially and laterally moved in any one of a plurality of directions, and a spring tending to hold said disc on said seat.

14. A valve comprising a body member having a tubular flange, the outer edge forming a seat, a valve disc having a grooved portion to receive said seat, and having a reentrant cupped portion projecting into said tubular flange, and a spring means bearing against the inside of the cupped portion to hold said disc upon said seat.

15. A valve comprising an apertured seat, a valve disc guided in said seat to move axially a limited distance and when free from said seat to move laterally partially to uncover the aperture in said seat, and resilient means operable to hold said disc on said seat, to hold said disc against said seat when the disc is in laterally displaced position, and to center said disc over said seat and move it toward said seat when the disc is dislodged from its laterally displaced position.

In witness whereof, I hereunto subscribe subscribe my name this 14th day of August, 1925.

WILLIAM ARTHUR GIFFORD.